United States Patent
Benoit et al.

(10) Patent No.: US 8,161,753 B2
(45) Date of Patent: Apr. 24, 2012

(54) BRAZED JOINT BETWEEN A TITANIUM-BASED METAL PART AND A CERAMIC PART BASED ON SILICON CARBIDE (SIC) AND/OR CARBON

(75) Inventors: Joël Michel Benoit, Cesson la Foret (FR); Jean-François Fromentin, Cesson la Foret (FR); Olivier Gillia, Sassenage (FR); Lucas Domergue, Reims (FR)

(73) Assignees: Snecma, Paris (FR); Commissariat A l'Energie Atomique, Paris (FR)

( * ) Notice: Subject to any disclaimer, the term of this patent is extended or adjusted under 35 U.S.C. 154(b) by 815 days.

(21) Appl. No.: 12/096,489

(22) PCT Filed: Dec. 8, 2006

(86) PCT No.: PCT/FR2006/051317
§ 371 (c)(1),
(2), (4) Date: Oct. 28, 2008

(87) PCT Pub. No.: WO2007/066051
PCT Pub. Date: Jun. 14, 2007

(65) Prior Publication Data
US 2009/0068004 A1   Mar. 12, 2009

(30) Foreign Application Priority Data
Dec. 8, 2005 (FR) .................... 05 53788

(51) Int. Cl.
*B32B 15/04* (2006.01)

(52) U.S. Cl. ............... 60/753; 416/241 R; 416/241 B; 428/627; 428/698

(58) Field of Classification Search ........ 60/753; 415/200; 416/241 R, 241 B, 229 A; 428/594, 428/623, 627, 632, 634, 665, 660, 673, 686, 428/698
See application file for complete search history.

(56) References Cited

U.S. PATENT DOCUMENTS

| | | | |
|---|---|---|---|
| 3,998,632 A * | 12/1976 | Kosteruk et al. | 420/422 |
| 4,723,862 A | 2/1988 | Ito et al. | |
| 5,113,052 A | 5/1992 | Gabriel | |
| 5,501,390 A | 3/1996 | Allen et al. | |
| 5,965,266 A * | 10/1999 | Goujard et al. | 428/408 |

(Continued)

FOREIGN PATENT DOCUMENTS

JP    04026568    1/1992

(Continued)

OTHER PUBLICATIONS

U.S. Appl. No. 12/096,663, filed Jun. 9, 2008, Benoit, et al.
U.S. Appl. No. 12/096,714, filed Jun. 9, 2008, Benoit, et al.
Office Action issued Nov. 29, 2010 in Russia Application No. 2008127506, filed Dec. 8, 2006 (With English Translation).

(Continued)

*Primary Examiner* — Ehud Gartenberg
*Assistant Examiner* — Vikansha Dwivedi
(74) *Attorney, Agent, or Firm* — Oblon, Spivak, McClelland, Maier & Neustadt, L.L.P.

(57) ABSTRACT

An assembly including a stack structure made up of the following elements assembled together by brazing: the titanium-based metal piece; a first intermediate piece suitable for deforming to accommodate differential expansion between the metal piece and a piece made of ceramic material based on silicon carbide and/or carbon; a second intermediate piece that is rigid, having a coefficient of expansion close to that of said ceramic material piece and made of aluminum nitride (AlN) or of tungsten (W); and the ceramic material piece is disclosed.

16 Claims, 1 Drawing Sheet

U.S. PATENT DOCUMENTS 6,131,797 A * 10/2000 Gasdaska et al. .......... 228/122.1

FOREIGN PATENT DOCUMENTS

WO    WO 2007/066052 A2    6/2007

OTHER PUBLICATIONS

Office Action issued Mar. 2, 2011 in China Application No. 200680046386.3 (With English Translation).

* cited by examiner

BRAZED JOINT BETWEEN A TITANIUM-BASED METAL PART AND A CERAMIC PART BASED ON SILICON CARBIDE (SIC) AND/OR CARBON

BACKGROUND OF THE INVENTION

The present invention relates to the field of using brazing to assemble together a titanium metal piece and a piece made of a ceramic material based on silicon carbide (SiC) and/or carbon.

In known manner, ceramic materials are characterized by their mechanical properties that make them suitable for constituting structural elements, and by their ability to conserve these mechanical properties at high temperature. Such materials are used in particular for fabricating pieces that are subjected to high thermomechanical stresses in aviation applications (engine parts or fairing elements).

Ceramic materials and metals are traditionally assembled together by a mechanical connection of the riveting or bolting type, which connection is sometimes unsuitable because of reasons of size or difficulties of implementation.

Furthermore, known methods of uniformly assembling ceramic materials that make use of organic precursors of ceramics are not adapted to heterogeneous assemblies between a ceramic material and a metal.

Furthermore, known brazing technologies used for making homogeneous ceramic/ceramic bonds are difficult to use for heterogeneous brazing between a ceramic material and a metal because of the very different thermomechanical and chemical behaviors of ceramic materials and of metals.

More precisely, if it is desired to use brazing to assemble a ceramic material on a metal alloy based on titanium, aluminum, and vanadium, then the assembly is confronted with a very large difference in expansion between those two items, given that the coefficient of expansion of such a metal alloy is about two to five times greater than the coefficient of expansion of ceramic materials. As a result, for a typical 30 millimeter (mm) assembly, it is necessary to accommodate an expansion offset of 0.2 mm on cooling the assembly from the solidification temperature of the brazing composition to ambient temperature.

The large amount of relative shrinking of the metal piece leads to high levels of stress between the two pieces, and in particular to a compression zone in the brazed joint adjacent to the ceramic piece and a traction zone adjacent to the metal piece.

As a result, the assembly bends, giving rise to stresses that can lead to rupture in one of the components, and to a brazed joint of poor strength because of its localized deformation.

The invention proposes solving the above-mentioned problem by interposing, between the metal piece and the ceramic material piece, intermediate pieces having coefficients of expansion that vary progressively so as to constitute a stack of elements that are to be assembled together thermally in pairs by brazing.

This gives rise to a problem of selecting the intermediate materials, and brazing compositions that are compatible with those materials, which compositions need to satisfy general problems in terms of chemical compatibility, and in particular they must provide a so-called "chemical barrier" function making it possible firstly to avoid elements migrating from the ceramic material (silicon carbide, carbon, . . . ) to the metal piece, or vice versa, and secondly to prevent undesirable chemical compounds forming.

More precisely, chemical and thermomechanical incompatibility between the ceramic material piece and the metal prevents direct brazing being performed for high temperature operation because:

most materials react very strongly with SiC above 1000° C., leading to numerous pores and fragile intermetallic compounds with low melting points being formed, which is very damaging for the mechanical strength of such assemblies; and the very great difference between the coefficients of thermal expansion (CTE) of metals (10 to $20 \times 10^{-6}$ per degree Celsius) and SiC-CMCs (2 to $6 \times 10^{-6}$ per degree Celsius) gives rise to high levels of residual stress at the interfaces leading to the assembly rupturing on cooling.

This incompatibility constitutes a major difficulty requiring the chemical, geometrical, and method aspects to be investigated simultaneously.

OBJECT AND SUMMARY OF THE INVENTION

A main object of the present invention is thus to solve those problems by proposing an assembly that makes it possible to compensate for the expansion difference between the metal piece and the ceramic piece, and secondly to avoid or limit the formation of undesirable chemical compounds.

More precisely, the invention provides an assembly between a titanium-based metal piece and a ceramic material piece based on silicon carbide and/or carbon. The assembly comprises a stack structure comprising the following elements assembled together in pairs by brazing:

the metal piece;
a first intermediate piece that is suitable for deforming to accommodate differential expansion between the metal piece and the ceramic material piece;
a second intermediate piece that is rigid, that has a coefficient of expansion close to that of the ceramic material piece, and that is made of aluminum nitride or of tungsten; and
the ceramic material piece.

The invention thus proposes interposing between the ceramic and metal pieces two intermediate pieces that have distinct functions.

The first intermediate piece serves to compensate for expansion differences between the ceramic and metal pieces, and does so by deforming.

In a first embodiment, the first intermediate piece deforms by said piece being made out of a ductile metal. Under such circumstances, the solid structural piece forms a layer of ductile material suitable for lengthening and shrinking between the ceramic and metal pieces.

In this first embodiment, the first intermediate piece is preferably made of substantially pure titanium.

In a second embodiment, the first intermediate piece is constituted by a structure that is deformable, i.e. that is "compliant".

Preferably, the structure comprises at least one link intermediate element that is assembled by brazing to the metal piece and to the second intermediate piece, the link intermediate element being constituted by a deformable sheet presenting flat zones for brazing and deformable zones.

Preferably, said deformable structure is constituted by at least one piece having the general shape of a concertina-folded tape defining curved portions facing alternately towards the metal piece and towards the second intermediate piece, the curved portions being separated by peaks, with assembly by brazing between the intermediate piece and the metal piece or between the first intermediate piece and the second intermediate piece being via flat zones at least some of the peaks.

The second intermediate piece presents firstly a coefficient of expansion that is smaller than that of the first intermediate piece that is made of metal, and preferably that is sufficiently close to the coefficient of expansion of the ceramic piece in order to limit expansion differences between these pieces.

Thereafter, the second intermediate piece acts as a chemical barrier by preventing metal elements migrating towards the ceramic piece, for the purpose of preventing fragile chemical compounds forming that are harmful to the assembly presenting good strength.

Finally, the second intermediate piece may be selected to be sufficiently elastic to make it possible to attenuate the mechanical stresses acting on the ceramic piece, and sufficiently rigid to enable the mechanical stresses acting on the ceramic piece to be distributed, thus enabling said piece to be protected mechanically since it is by nature generally fragile.

In preferred manner, the metal piece is constituted by an alloy based on titanium, aluminum, and vanadium. This alloy is known as "TA6V".

The coefficient of expansion of the TA6V alloy at 500° C. is equal to $10.5 \times 10^{-6} K^{-1} \pm 15\%$.

In an embodiment of the invention, the ceramic material piece is made of solid or monolithic silicon carbide. This material can be obtained in particular by sintering a powder or granules of silicon carbide. The ceramic matrix may have a single phase, e.g. be constituted entirely out of SiC. Alternatively, it may comprise a plurality of phases, the matrix containing for example an alternating sequence of layers having different stiffnesses based on sintered silicon carbide and/or on pyrolytic carbon, and capable also of including at least one self-healing phase such as a layer based on boron-containing silicide Si—B—C.

In another embodiment of the invention, the ceramic material piece has a ceramic matrix reinforced by silicon carbide or carbon fibers, in particular with a layer of silicon carbide at the surface.

In the embodiment in which the ceramic material piece comprises a ceramic matrix reinforced by silicon carbide or carbon fibers, the matrix may include at least one self-healing phase. Such a ceramic material, referred to below as "A410", and a method of obtaining the ceramic material are described in the French patent application published under the number FR 2 732 338.

The coefficient of expansion of the "A410" material at 500° C. is equal to $4.0 \times 10^{-6} K^{-1} \pm 15\%$.

In another preferred variant, the ceramic material piece is a piece of thermostructural material comprising carbon fiber reinforcement and a sequenced matrix of alternating layers of relatively flexible material capable of deflecting any cracks that might reach them, and layers of relatively rigid ceramic material.

Such a material, referred to below as "A500", can be obtained by a method of preparation as described in patent application FR 2 742 433.

The coefficient of expansion of the "A500" compound at 500° C. is equal to $2.5 \times 10^{-6} K^{-1} \pm 15\%$.

Since the ceramic material piece is very brittle, it is necessary for the second intermediate piece to be suitable for absorbing forces and for its coefficient of expansion to be close to that of the ceramic material piece.

Thus, for this second intermediate piece, the inventors advantageously prefer aluminum nitride (AlN) or tungsten (W) since they are very rigid and have coefficients of expansion that are only slightly greater than that of the ceramic.

The coefficient of expansion of tungsten W and the coefficient of expansion of aluminum nitride at 500° C. are respectively equal to $5.0 \times 10^{-6} K^{-1} \pm 15\%$ and $5.2 \times 10^{-6} K^{-1} \pm 15\%$.

In accordance with the invention, the brazing compound used needs to be reactive, i.e. it must react with at least one of the chemical elements of the facing materials.

That is why a compound made of pure silver is not suitable, since silver is not reactive in the meaning of the above definition. Furthermore, the melting temperature of silver is much too low for the applications intended by the invention.

A brazing compound of the Ag—Cu type is also unsuitable, since it does not present sufficient "wetting" properties relative to aluminum nitride or the ceramic material piece based on silicon carbide and/or carbon.

The brazing composition used is preferably a composition based on silver.

Preferably, the composition is of the Ag—Cu—Ti or the Ag—Mn type.

With the Ag—Cu—Ti brazing composition, the percentage by weight of silver is not less than 50% and the percentage by weight of titanium is preferably selected in the range 0.01% to 6%. This composition is very reactive with aluminum, tungsten, and silicon, including when it has only a small amount of titanium.

Preferably, the Ag—Cu—Ti composition used in the invention comprises the following percentages by weight: 63 Ag; 35.25 Cu; and 1.75 Ti.

This brazing composition presents the advantage of being commercially available under the name CuSi-ABA (commercial name).

With an Ag—Mn brazing composition, the percentage by weight of manganese is preferably selected to lie in the range 1% to 25%, the manganese content being explained by the fact that manganese possesses reactive properties with the above-mentioned elements that are only a little less than those of titanium.

The invention also provides a turbomachine nozzle including at least one assembly as mentioned above in which the metal piece is a casing (or a lever) of the nozzle and the ceramic material piece is a flap of the nozzle.

The invention also provides a turbomachine combustion chamber including at least one assembly as mentioned above in which the metal piece is a casing (or a joint, i.e. a connection element, or a part) of said chamber, and the ceramic material piece is a component part of the chamber.

The invention also provides post-combustion equipment for a turbomachine, the equipment including at least one assembly as mentioned above, in which the metal piece is a post-combustion casing (or platform), and the ceramic material piece is a flame-holder arm.

The invention also provides a turbomachine including at least one assembly as mentioned above.

BRIEF DESCRIPTION OF THE DRAWING

Other characteristics and advantages of the present invention appear from the description below made with reference to the accompanying drawing which show an embodiment having no limiting character. In the figures.

DETAILED DESCRIPTION OF EMBODIMENTS

Figure 1:
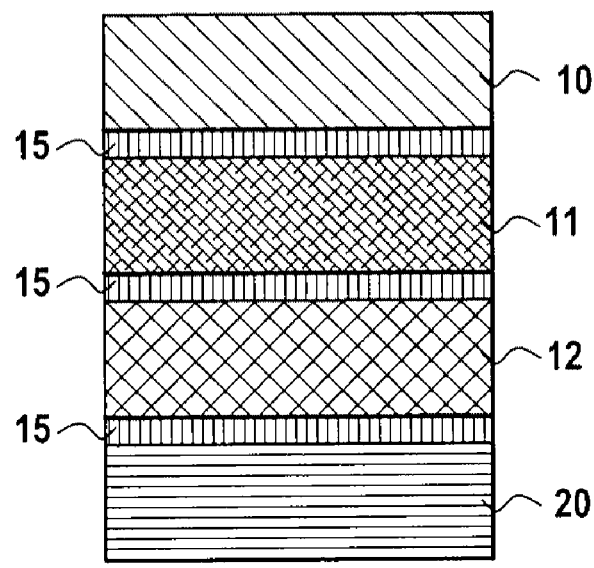
FIG. 1 shows an assembly in accordance with a first embodiment of the invention.

FIG. 1 shows an assembly in accordance with the invention in a first embodiment. It is constituted mainly by four pieces assembled together in pairs by brazing, namely:

a metal piece 10 based on titanium;

a ceramic material piece 20 based on silicon carbide and/or carbon;

a first intermediate piece 11 suitable for deforming so as to accommodate expansion differences between the metal piece 10 and the ceramic material piece 20; and a second intermediate piece 12 made of aluminum nitride AlN or of tungsten W.

In the example described, the metal piece 10 is a plate or strip of an alloy based on titanium, aluminum, and vanadium (TA6V).

The ceramic material piece 20 may be constituted by a plate or strip of monolithic (or solid) silicon carbide, or of the "A410" or "A500" material as mentioned above.

In another embodiment, the ceramic material piece 20 is made of ceramic matrix composite material. The ceramic matrix may comprise a single phase—e.g. it may be made entirely out of a SiC—or it may comprise a plurality of phases, for example it may also contain at least one phase having a self-healing property as described in patent FR 2 732 338.

It is recalled that such a material reinforced with SiC fibers is referred to herein as "A410".

In a variant, the ceramic matrix material is constituted by carbon fiber reinforcement and a sequenced ceramic matrix, with alternating layers of rigid ceramic material and layers that are relatively flexible—capable of deflecting cracks. It is recalled that such a material is referred to herein as "A500". It can be obtained by a preparation method as described in French patent application FR 2 742 433.

Amongst the examples of structural thermocomposite materials, the following may be mentioned: carbon/carbon (C/C) composites and ceramic matrix composites (CMCs) such as C/SiC or SiC/SiC (SiC or carbon fiber reinforcement with a silicon carbide matrix) or C/C—SiC (carbon fiber reinforcement and a composite matrix of carbon and silicon carbide) or C/Si—B—C (carbon fiber reinforcement and a self-healing matrix), or indeed C/C—SiC—Si (C/C composite silicided by reaction with Si).

In the presently-described example, the first intermediate piece 11 presents a solid structure. This piece 11 is made of a material that is sufficiently ductile to deform so as to compensate for the difference in expansion between the metal and ceramic pieces. Naturally, the dimensions of this first intermediate piece 11, and in particular its thickness, need to be sufficient to enable said piece to be capable of performing this function of a deformable piece without being subjected to excessive amounts of deformation.

In the presently-described embodiment, the first intermediate piece 11 is made of substantially pure titanium known as T40. It would also be possible to use T30 or T60.

Table 1 below summarizes six assemblies in accordance with above-described FIG. 1.

The first column gives the composition (A410 or A500) of the ceramic material piece 20, the composition (AlN or W) of the second intermediate piece 12, the composition (T40, substantially pure titanium) of the first intermediate piece 11, and the composition (TA6V alloy of titanium, aluminum, and vanadium) of the metal piece 10.

The second column gives the brazing composition used in making the assemblies, which composition is referred 15 in FIG. 1.

The brazing composition is constituted either by a composition of the Ag—Mn (Mn 15%) type, or by a composition of the Ag—Cu—Ti (63 Ag; 35.25 Cu; 1.75 Ti) type. It is also possible to use an AgZr composition (Zr 3%).

These six assemblies initially withstood cooling from brazing temperature to ambient temperature.

In addition these assemblies were subjected to shear tests using a test piece comprising a symmetrical assembly as follows: CMC piece/W or AlN piece/Ti piece/titanium-based metal piece/Ti piece/W or AlN piece/CMC piece.

The outermost pieces made of CMC materials were held in lateral jaws, while the middle piece in the center was subjected to a transverse force, thereby exerting overall shear stress in the two intermediate zones between each outermost piece made of CMC and the central piece made of metal, via the intermediate pieces.

The last column in the table gives the relative value for the shear strength reached on breakage of the assembly under shear testing.

This relative strength should be assessed relative to the shear strength of the piece 20 made of ceramic material alone, without any assembly.

Thus, the person skilled in the art will understand that the shear strength of assembly No. 1 was equal to 50% of the shear strength of the A500 material.

TABLE 1

| Assembly | | Brazing composition | F/So (MPa) |
|---|---|---|---|
| 1 | A500-W-T40-TA6V | Ag—Mn (Mn 15%) | 50% |
| 2 | A410-W-T40-TA6V | Ag—Mn (Mn 15%) | 200% |
| 3 | A500-AlN-T40-TA6V | Ag—Cu—Ti (63 Ag; 35.25 Cu; 1.75 Ti) | 50%-80% |
| 4 | A410-AlN-T40-TA6V | Ag—Cu—Ti (63 Ag; 35.25 Cu; 1.75 Ti) | 70%-130% |
| 5 | A500-W-T40-TA6V | Ag—Cu—Ti (63 Ag; 35.25 Cu; 1.75 Ti) | 40%-70% |
| 6 | A410-W-T40-TA6V | Ag—Cu—Ti (63 Ag; 35.25 Cu; 1.75 Ti) | 70%-130% |

It can be seen that the shear strength of the assembly obtained in accordance with the invention reaches or even exceeds (under the most favorable circumstances) the shear strength of the CMC material piece. This constitutes a determining quality for such a mechanical assembly (the strength of the joint reaching a value that is equal to or greater than that of the assembled pieces).

Figure 2:
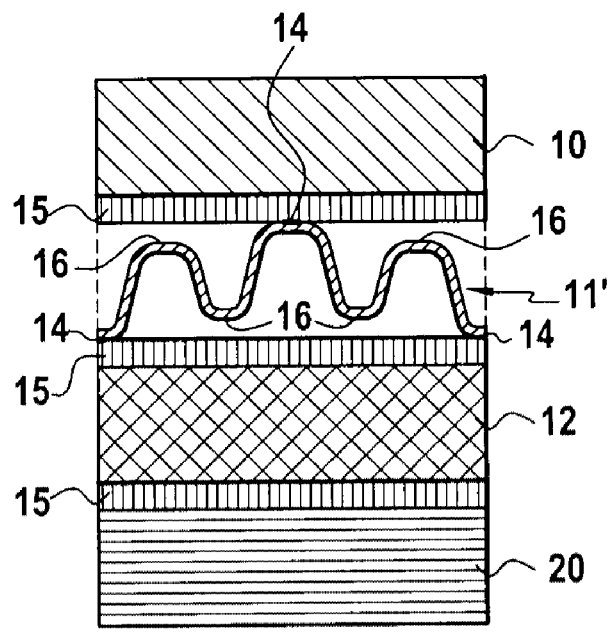
FIG. 2 shows an assembly in accordance with a second embodiment of the invention.

FIG. 2 shows another assembly in accordance with the invention in which the first intermediate piece 11' is constituted by a structure that is deformable (i.e. "compliant").

In general manner, the intermediate piece 11' can be made by deforming a sheet 16 so as to have concentric undulations and flat zones 14 formed in alternating opposite peaks of the undulations, or in only some of those peaks. The flat zones 14 are brazed in alternation and, depending on their orientation, either to the metal piece 10 or to the second intermediate piece 12.

In the embodiment of FIG. 2, the deformable structure 11' is constituted by a piece of general shape corresponding to that of a concertina-folded tape defining curved portions facing alternatively towards the metal piece 10 and towards the second intermediate piece 12.

These curved portions are separated by peaks 14, 16, with assembly by brazing 15 between this first intermediate piece 11' and the metal piece 10 or the second intermediate piece 12 being performed in flat zones 14 of some of the peaks.

The assembly of the invention can be used in a turbomachine, and more particularly in a turbojet. For example, the metal piece 10 may belong to a turbojet casing and the ceramic piece may be: a nozzle flap; a part of the combustion chamber; or a post-combustion flame-holder arm.

The invention claimed is:

1. An assembly between a titanium-based metal piece and a ceramic material piece based on silicon carbide and/or carbon, the assembly comprising a stack structure comprising the following elements assembled together by brazing, in the following order:
    said metal piece;
    a first intermediate piece that is suitable for deforming to accommodate differential expansion between said metal piece and said ceramic material piece;
    a second intermediate piece that is rigid, that has a coefficient of expansion close to that of said ceramic material piece, and that is made of aluminum nitride (AlN) or of tungsten (W); and
    said ceramic material piece,
    wherein the brazing composition that assembles said second intermediate piece to the ceramic material piece is of the Ag—Mn type with a percentage by weight of manganese (Mn) that lies in the range 1% to 25%.

2. An assembly between a titanium-based metal piece and a ceramic material piece based on silicon carbide and/or carbon, the assembly comprising a stack structure comprising the following elements assembled together by brazing, in the following order:
    said metal piece;
    a first intermediate piece that is suitable for deforming to accommodate differential expansion between said metal piece and said ceramic material piece;
    a second intermediate piece that is rigid, that has a coefficient of expansion close to that of said ceramic material piece, and that is made of aluminum nitride (AlN) or of tungsten (W); and
    said ceramic material piece,
    wherein the brazing composition that assembles said second intermediate piece and the ceramic material piece is of the Ag—Cu—Ti type with a percentage by weight of silver (Ag) not less than 50% and a percentage by weight of titanium (Ti) lying in the range 0.01% to 6%.

3. The assembly according to claim 2, wherein said Ag—Cu—Ti brazing composition comprises the following percentages by weight: 63 of Ag; 35.25 of Cu; and 1.75 of Ti.

4. The assembly according to any one of claims 1 to 3, wherein said ceramic material piece is made of solid silicon carbide.

5. The assembly according to any one of claims 1 to 3, wherein said ceramic material piece comprises a ceramic matrix reinforced by silicon carbide or carbon fibers.

6. The assembly according to claim 5, wherein said matrix includes at least one self-healing phase.

7. The assembly according to any one of claims 1 to, 3 wherein the metal piece is made of an alloy based on titanium, aluminum, and vanadium.

8. The assembly according to any one of claims 1 to 3, wherein said first intermediate piece is made of a ductile solid material.

9. The assembly according to claim 8, wherein said first intermediate piece is made of substantially pure titanium.

10. The assembly according to any one of claims 1 to 3, wherein first intermediate piece is in the form of a deformable structure.

11. The assembly according to claim 10, wherein said deformable structure includes at least one connecting intermediate element assembled by brazing to said metal piece and to said second intermediate piece, said connecting intermediate element being in the form of a deformable sheet presenting concentric undulations and brazed flat zones.

12. The assembly according to claim 11, wherein said deformable structure includes at least one piece having the general shape of a concertina-folded tape defining curved portions facing alternately towards the metal piece and towards the second intermediate piece, said curved portions being separated by peaks, assembly by brazing between the metal piece and the first intermediate piece or the second intermediate piece as the case may be being performed via flat zones of at least some of said peaks.

13. A turbomachine nozzle including at least one assembly according to any one of claims 1 to 3, wherein said metal piece is a casing of said nozzle and said ceramic material piece is a flap of said nozzle.

14. A turbomachine combustion chamber including at least one assembly according to any one of claims 1 to 3, wherein said metal piece is a casing of said chamber and said ceramic material piece is a component part of said chamber.

15. A post-combustion equipment for a turbomachine, the equipment including at least one assembly according to any one of claims 1 to 3, in which said metal piece is a post-combustion casing and said ceramic material piece is a flame-holder arm.

16. A turbomachine including at least one assembly according to any one of claims 1 to 3.

* * * * *